United States Patent
Pelham et al.

[15] 3,701,256
[45] Oct. 31, 1972

[54] DEMAND, SOLID-PROPELLANT GAS GENERATOR

[72] Inventors: Joseph E. Pelham; Albert Ray Osburn, both of Brigham City, Utah

[73] Assignee: Thiokol Chemical Corporation, Bristol, Pa.

[22] Filed: Sept. 13, 1971

[21] Appl. No.: 179,687

[52] U.S. Cl. .................... 60/39.47, 60/254, 60/256, 60/39.09
[51] Int. Cl. ............................................. F02k 9/04
[58] Field of Search.....60/234, 39.47, 254, 256, 250, 60/253, 39.09; 102/34.5, 49.7, 49.8

[56] References Cited

UNITED STATES PATENTS

| | | |
|---|---|---|
| 3,287,912 | 11/1966 | Wehlow et al...............60/256 |
| 3,142,959 | 8/1964 | Klein........................60/39.47 |
| 2,956,401 | 10/1960 | Kane.........................60/256 |
| 3,248,875 | 5/1966 | Wolcott....................60/39.47 |
| 3,392,524 | 7/1968 | Caveny......................60/234 |

Primary Examiner—Douglas Hart
Assistant Examiner—Robert E. Garrett
Attorney—Edward E. McCullough

[57] ABSTRACT

An orificed pressure vessel has a combustion chamber adjacent the orifice and a propellant charge in the remainder thereof comprising wafer segments of propellant separated from each other by combustion barriers; an electric igniter adjacent each propellant wafer has a thermally operated, normally open switch, so that the circuit is closed for each igniter as the adjacent wafer is burned; a pressure transducer in communication with the combustion chamber operates a master switch connected in series with the igniters and an electrical energy source to close the entire circuit or open it in response to a predetermined maximum and minimum chamber pressure; and valve means on the orifice permits withdrawal of gases from the combustion chamber for use as desired. Optional equipment includes a pressure relief valve in the combustion chamber and a capacitor connected in parallel between the energy source and the igniters.

5 Claims, 3 Drawing Figures

PATENTED OCT 31 1972 3,701,256

INVENTORS
Joseph E. Pelham
Albert Ray Osburn

By: Edward E. McCullough
AGENT

DEMAND, SOLID-PROPELLANT GAS GENERATOR

CROSS REFERENCE TO RELATED APPLICATIONS

This application is somewhat related to a copending application, owned by the same assignee, titled "Rocket Motor," Ser. No. 566,1330, now U.S. Pat. No. 3,656,304 by E. McCullough.

BACKGROUND OF THE INVENTION

This invention relates to solid propellant gas generators, and particularly to those having on and off capability, such as those having wafers of solid propellant sealed off from one another that may be burned serially as desired. The invention herein described was made in the course of or under a contract with the U. S. Air Force.

Controllability of rockets and rocket propelled vehicles, especially of the solid propellant type, has always been accomplished with considerable difficulty. In the booster phase of a ballistic trajectory, attitude and directional control of a rocket vehicle is ordinarily accomplished by manipulation of the thrust of the rocket. However, when the booster has been spent, a need usually remains for propulsive gases to correct the attitude, direction, and velocity of the vehicle. For maximal precision, it is desirable that such gases by available instantly and at a known pressure. Such a system heretofore has been unavailable.

SUMMARY OF THE INVENTION

The present invention is directed toward filling this need, which is not adequately satisfied in the prior art. It is a constant pressure gas generator that can provide gas instantaneously and at a predictable pressure.

An orificed pressure vessel, having a combustion chamber adjacent the orifice, is filled with a propellant charge comprising wafer segments of propellant sealed off from one another by combustion barriers. Each wafer of propellant is equipped with an electrically fired ignition device, connected in parallel together with thermally operated normally open switches, so that as each wafer burns, it closes the circuit of the adjacent igniter. In this way the wafers of propellant automatically burn serially.

A pressure transducer in communication with the combustion chamber monitors the pressure therein and operates a master switch that may interrupt and restart the combustion of the propellant when the chamber pressure reaches a predetermined maximum or minimum. The pressure vessel may also be equipped with a pressure relief valve to protect it from overpressurization. An exhaust valve in the orifice of the pressure vessel permits metering of the chamber gases into any of various devices for attitude velocity, and directional control.

Objects of the invention are to provide a solid propellant gas generator that will automatically maintain a source of gas at a known pressure for relatively long periods of time and without waste of gases. Important features of the invention are that it is uncomplicated in structure, reliable, and light in weight (since no propellant is wasted).

Other objects and advantages of the invention will become apparent as the following detailed description is read with reference to the accompanying drawings, wherein the same parts are designated by the same numbers throughout the disclosure.

DESCRIPTION OF THE PREFERRED EMBODIMENTS

Figure 1:
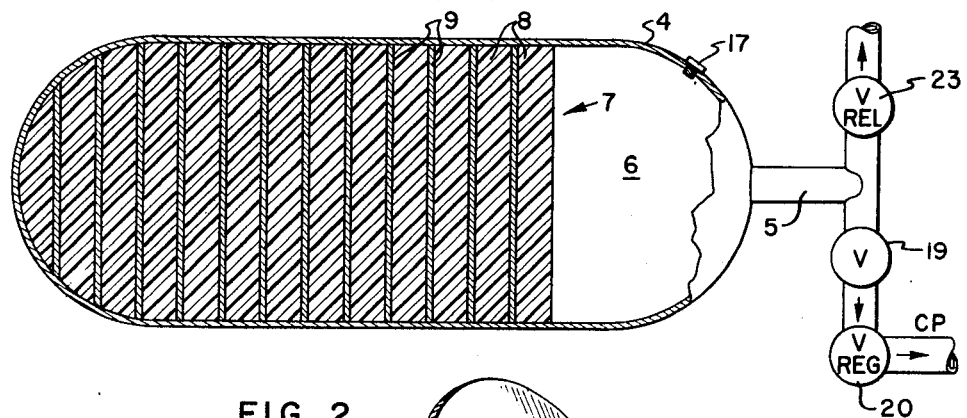
FIG. 1 is a longitudinal section of the invention.
Figure 2:
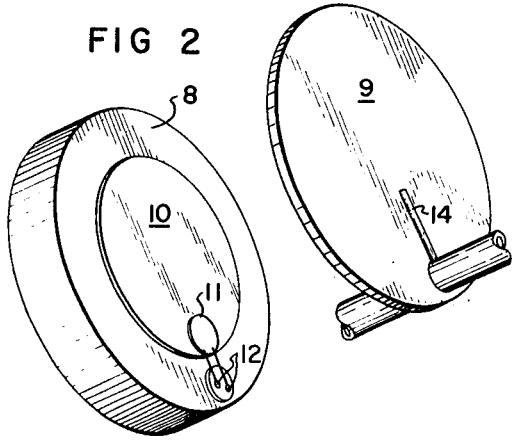
FIG. 2 is a perspective view of a typical propellant wafer removed from the invention.

As shown in FIG. 1, a pressure vessel 4, has the general configuration of a solid propellant rocket motor, with an orifice 5 in one end thereof. The end portion adjacent the orifice 5 is reserved as the combustion chamber 6, the remainder being filled with a propellant charge 7. This charge 7 comprises a series of wafer segments 8 stacked and separated from one another by thin combustion barriers 9. The combustion barriers 9 are normally made of an elastomeric sealant material having a low oxidizer content, so that it is not easily ignitable. Each wafer segment 8 of propellant is equipped with an electrically operated ignition device 10. These igniters 10 are built on the orifice side of each wafer 8 between the wafer 8 and its combustion barrier 9, and are therefore flat in form. They may be any of a number of ignition devices such as pyrotechnic fuses fired by electric squibs, films of pyrotechnic composition initiated by electric squibs, or other material that burns at high temperatures such as magnesium wire ignited by electric squibs.

Figure 3:
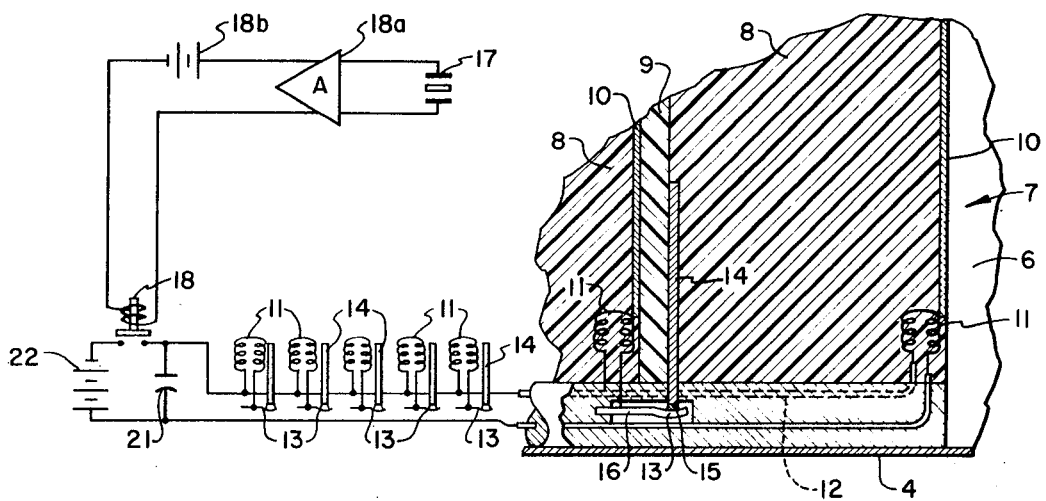
FIG. 3 is a wiring diagram of the system, including a fragmentary section showing mechanical parts.

As shown in FIG. 3, each electric squib 11 is connected in parallel between two long bus bars 12, that extend the length of the propellant charge 7. Normally open switches 13 are closed serially by the heat of combustion of each wafer, closing the circuit of the following igniter. The switches 13 may be any of several types of thermally operated switches. The example shown in FIG. 3 has a heat conducting rod 14 on the orifice side of each combustion barrier 9, that conducts heat to melt a drop of solder 15 to release a reed switch 16 held open thereby. In this way, only one igniter circuit at a time is closed and ready for firing, and the wafers 8 of the propellant charge 17 will automatically burn in series.

A pressure sensing device 17, such as a piezoelectric transducer, is built into the wall of the pressure vessel 4 to operate a master switch 18 via an amplifier 18a and a battery 18b. This switch is normally closed and is opened to stop combustion of the propellant charge 7 whenever the chamber pressure reaches a predetermined maximum. It is held open as long as the chamber pressure remains above this level. The switch 18 will be closed to reinitiate combustion of the propellant 7 when the pressure falls below a predetermined minimum. This master switch 18 may also be opened and closed in response to command signals initiated outside the system described.

An exhaust valve 20 may be opened to permit withdrawal of the gas from the pressurized combustion chamber 6 whenever this gas is needed for use. A pressure regulator 20 in tandem therewith permits metering of the gases at a desired pressure. A capacitor 21 may be connected in parallel between the energy source 22 and the squibs 11 to insure a firing pulse of adequate voltage. A pressure relief valve 23 in the wall of the chamber 6 may be used to prevent overpressurization thereof.

The propellant of the wafers 8 may be virtually any kind of well know solid propellant used in rockets, and is selected according to the temperature, pressure, and burning rate desired for a specific application. The pressure vessel 4 is made of materials and by techniques well known in rocket technology. The combustion barriers 9 may be made of any of a number of well known elastomeric sealants that are normally low in oxidizer content, such as elastomeric lining compositions used to bond solid propellant grains into rocket cases. An example of such a composition is, in percentages by weight:

| | |
|---|---|
| polybutadiene acrylic acid acrylonitrile terpolymer | 46.7% |
| carbon particles (finely divided) | 49.0 |
| tris (1-(2-methyl) aziridinyl) phosphine oxide | 1.4 |
| iron octoate (ferric salt of 2-ethyl hexanoic acid in a 6% solution, or ferric-2-ethyl hexoate) | 0.9 |
| p-(2, 3 epoxypropoxy) N, -2-3 epoxypropanilene | 1.0 |
| triglyceride of hydroxy stearic acid | 1.0 |

It is important to note that propellant wafers 8 burn automatically in series until the combustion is interrupted and restarted by operation of the master switch 18, which is normally accomplished by the pressure transducer 17. By this means, the chamber pressure may be maintained at a constant level and gas therefrom is ready for instant use throughout the trajectory of the vehicle without waste of gas.

An invention has been described that constitutes an advance in the art of gas generators that are especially useful for operating control mechanisms on rocket propelled vehicles. Although the embodiments have been described with considerable specificity with regard to detail, it should be noted that such detail may be altered considerably without departing from the scope of the invention as it is defined in the following claims.

The invention claimed is:

1. A gas generator comprising:
   an orificed pressure vessel having a combustion chamber adjacent the orifice;
   a solid propellant charge in the pressure vessel comprising wafer segments of propellant and combustion barriers separating and sealing the wafer segments from one another;
   an electrically operated igniter adjacent each wafer segment of propellant;
   an electrical energy source connected to the igniters in a circuit;
   switch means connected in the circuit for selectively firing the igniters in series;
   a pressure transducer in communication with the combustion chamber for monitoring the pressure thereof and operatively connected to the switch means, for interrupting and restarting combustion of the propellant in response to pressure changes within the combustion chamber; and
   valve means on the orifice, whereby gas from the combustion chamber may be withdrawn for use as desired.

2. The gas generator of claim 1 further including a pressure regulator in tandem with the valve means, for metering gases therethrough at a desired pressure.

3. The gas generator of claim 1 further including a pressure relief valve in the pressure vessel wall, whereby escape of excess gas may be permitted when the pressure in the combustion chamber is higher than a predetermined maximum.

4. The gas generator of claim 1, further including a capacitor connected in parallel between the igniters and the energy source to insure an electrical pulse of sufficient strength to fire each electric squib without failure.

5. A gas generator comprising:
   a cylindrical pressure vessel having domed ends, with an orifice in one end and a combustion chamber adjacent the orifice;
   a propellant charge filling the vessel except for the combustion chamber, comprising wafer segments of propellant and combustion barriers sealing off the wafer segments from one another, the combustion barriers being made of noncombustible elastomeric material;
   a film of pyrotechnic material on the combustion chamber side of each propellant wafer;
   an electric squib in contact with each pyrotechnic film;
   a thermally operated, normally open, electric switch connected to each electric squib, these switches being connected together in parallel so that combustion of each wafer segment of the series will automatically close the circuit for the adjacent propellant wafer;
   a master switch connected in series with the squibs and their switches;
   an electrical energy source connected in series with the master switch and the squibs;
   a capacitor connected in parallel between the energy source and the squibs;
   a pressure transducer mounted in the wall of the pressure vessel in communication with the combustion chamber thereof and operatively connected to the master switch to open the circuit when the pressure in the combustion chamber reaches a predetermined maximum and to close it when that pressure reaches a predetermined minimum, whereby combustion of the propellant charge may be interrupted and restarted;
   a pressure relief valve in the wall of the combustion chamber to permit escape of excess gas when the pressure therein reaches a predetermined maximum; and
   valve means on the orifice of the pressure vessel to permit metering of gases therefrom.

* * * * *